US012738151B2

(12) United States Patent
Wu

(10) Patent No.: US 12,738,151 B2
(45) Date of Patent: Sep. 15, 2026

(54) SENSOR DEVICE, HOLSTER SENSING SYSTEM, AND VIDEO-RECORDING SYSTEM

(71) Applicant: Getac Technology Corporation, New Taipei City (TW)

(72) Inventor: Ming-Zong Wu, Taipei City (TW)

(73) Assignee: Getac Technology Corporation, New Taipei City (TW)

( * ) Notice: Subject to any disclaimer, the term of this patent is extended or adjusted under 35 U.S.C. 154(b) by 181 days.

(21) Appl. No.: 18/763,307

(22) Filed: Jul. 3, 2024

(65) Prior Publication Data

US 2025/0029481 A1 Jan. 23, 2025

Related U.S. Application Data

(60) Provisional application No. 63/527,527, filed on Jul. 18, 2023.

(30) Foreign Application Priority Data

Sep. 27, 2023 (CN) ......................... 202311265500.3

(51) Int. Cl.
*G08C 19/06* (2006.01)

(52) U.S. Cl.
CPC .................................... *G08C 19/06* (2013.01)

(58) Field of Classification Search
CPC ......... H03K 17/952; H03K 2017/9527; G01V 3/101; G01V 3/10; G01V 3/104; G08C 19/06; F41C 33/029
See application file for complete search history.

(56) References Cited

U.S. PATENT DOCUMENTS

| | | | | |
|---|---|---|---|---|
| 5,479,149 A | 12/1995 | Pike | | |
| 7,292,026 B2 * | 11/2007 | Lee | ....................... | F02D 11/106 324/207.17 |

(Continued)

FOREIGN PATENT DOCUMENTS

| | | |
|---|---|---|
| CN | 107407543 A | 11/2017 |
| CN | 208671806 U | 3/2019 |

(Continued)

OTHER PUBLICATIONS

Search Report issued on Dec. 20, 2024 for EP application No. 24187658.0, 7 pages.

*Primary Examiner* — Tung X Nguyen
(74) *Attorney, Agent, or Firm* — Cooper Legal Group, LLC

(57) ABSTRACT

A sensor device, a holster sensing system, and a video-recording system are provided. The sensor device includes a control unit and a sensing module. The sensing module includes a reference coil set and an induction coil set that are arranged in a stacked structure. The sensing device is fixed on a holster. The induction coil set is configured to be adjacent to the holster. The control unit determines whether a gun is in the holster according to an inductance change between a sensing value generated by the induction coil set and a reference level provided by the reference coil set. In an application of the video-recording system, the control unit transmits a trigger signal to a recording device if the gun is determined to be pulled out of the holster according to the inductance change, so that the recording device is activated to start recording.

11 Claims, 10 Drawing Sheets

(56) References Cited

U.S. PATENT DOCUMENTS

| | | | |
|---|---|---|---|
| 11,385,022 B2 | 7/2022 | Hatcher et al. | |
| 2017/0074617 A1 | 3/2017 | Stewart et al. | |
| 2017/0302273 A1 | 10/2017 | Kántor et al. | |
| 2019/0063864 A1* | 2/2019 | Stewart | F41A 17/20 |

FOREIGN PATENT DOCUMENTS

| | | |
|---|---|---|
| CN | 112683108 A | 4/2021 |
| CN | 115695695 A | 2/2023 |
| EP | 2366972 A2 | 9/2011 |
| EP | 2493076 B1 | 8/2018 |
| TW | 188645 U | 8/1992 |
| TW | 202119005 A | 5/2021 |
| WO | 2018151785 A1 | 8/2018 |

* cited by examiner

SENSOR DEVICE, HOLSTER SENSING SYSTEM, AND VIDEO-RECORDING SYSTEM

CROSS-REFERENCE TO RELATED PATENT APPLICATION

This application claims the benefit of priorities to the U.S. Provisional Patent Application Ser. No. 63/527,527, filed on Jul. 18, 2023, and China Patent Application No. 202311265500.3, filed on Sep. 27, 2023, in the People's Republic of China. The entire content of each of the above identified applications is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a sensor device and its application, and more particularly to a sensor device with stacked coil sets, a holster sensing system having the sensor device and a video-recording system.

BACKGROUND OF THE DISCLOSURE

Currently, a security guard, a soldier, or a police officer who needs to carry a gun or any other weapon often wears a body-worn recording device. The body-worn recording device can completely record images/videos of the person when using the gun or any other weapon. The recorded images can be referred to for resolving disputes associated with use of the weapon. In addition, the recorded images can be transmitted to a control center that supports duties of the security guard, the soldier, or the police officer for further applications, such as quickly providing assistance in an emergency.

Conventionally, the person who wears the body-worn recording device needs to manipulate the recording device by himself to record images. Since the body-worn recording device is generally equipped with a small capacity battery due to its small-sized body, the need for long-term recording cannot be met. As such, the recording function of the body-worn recording device is activated only when recording is required. However, the person may forget to activate the recording function in an emergency, or the recording device may fail to record critical images in time.

One of the situations requiring video recording is when the police officer determines that pulling out of the gun is required for a specific event. At this time, the police officer needs to activate the body-worn recording device himself for recording the video. However, when an emergency event occurs, the police officer may not promptly activate the body-worn recording device to start recording since he needs to pull out and hold the gun right away.

SUMMARY OF THE DISCLOSURE

In order to provide a solution for cooperatively activating peripheral devices to operate when an emergency event occurs, the present disclosure provides a sensor device that is used to detect a specific emergency event, and a holster sensing system and a video-recording system that incorporate the sensor device.

The sensor device mainly includes a control unit and a sensing module. The sensing module includes two coil sets, such as a reference coil set and an induction coil set. The two coil sets can be arranged in a stacked structure. The sensor device is fixed on a side of an object. The induction coil set is configured to be adjacent to the object. The reference coil set that is relatively away from the object provides a reference level. Further, an inductive area of the reference coil set can be smaller than an inductive area of the induction coil set. The control unit relies on a physical quantity difference between a sensing value generated by the induction coil set and the reference level provided by the reference coil set to determine whether a metal item disposed on the other side of the object is present.

In one further aspect, the reference coil set includes two first coils disposed on two sides of a first substrate, and the induction coil set includes two second coils disposed on two sides of a second substrate. The physical quantity difference is an inductance change between the induction coil set and the reference coil set, and the control unit determines whether the metal item is present according to an electrical signal formed by the inductance change.

The sensor device also includes a communication unit that is used to transmit a trigger signal generated by the control unit according to the physical quantity difference. The sensor device includes a power unit that is controlled by the control unit for supplying current signals to the sensing module, such that the induction coil set and the reference coil set can be enabled to induce magnetic fields.

In an aspect, the sensing module of the sensor device implements a proximity sensor or a differential inductive switch. When the power unit supplies the current signals to the two coil sets of the sensing module, the reference coil set and the induction coil set form two different effective sensing ranges for respectively generating a reference inductance and an inductive inductance.

Further, the inductive area of the reference coil set is configured to be smaller than the inductive area of the induction coil set, so that the inductance change generated when the metal item approaches the reference coil set can be reduced.

Still further, when the metal item approaches or moves away from a side of the induction coil set, inductances formed by the induction coil set and the reference coil set are subject to change. The inductance of the induction coil set can be lower or higher than the inductance of the reference coil set, so that the physical quantity difference is generated and received by the sensing module. The sensing module then outputs a sensing result.

In an aspect of controlling, the control unit performs a clock control through pulse-width modulation, so as to achieve frequency control that can enable the induction coil set and the reference coil set of the sensing module to provide inductance.

According to one embodiment of the holster sensing system that incorporates the sensor device, the holster sensing system includes a holster for accommodating a gun. The gun is attached with a metal item that can be sensed by the sensor device. The sensor device on the holster corresponds in position to the metal item when the gun is accommodated into the holster.

According to the design of the sensor device, the induction coil set is disposed adjacent to the holster, and the reference coil set is relatively distant from the holster. Therefore, the control unit can rely on the physical quantity difference between the sensing value generated by the induction coil set and the reference level provided by the reference coil set to determine whether the metal item is present.

Afterwards, the control unit transmits a trigger signal when the gun is determined to be pulled out of the holster according to a sensing result generated by the sensing module. The sensor device enters a power-saving mode when a period of time during which the gun is pulled out of the holster is determined to exceed a time threshold.

According to one embodiment of the video-recording system that incorporates the sensor device, the video-recording system includes a recording device, a holster, and the sensor device. The recording device includes a communication module and a photographing module. The holster is used to accommodate a gun, and the gun includes a metal item that can be sensed. The sensor device can be disposed on the holster, and the sensor device corresponds in position to the metal item when the gun is accommodated into the holster.

When the sensor device is in operation, the metal item may approach or move away from a side of the induction coil set, and the inductances formed by the induction coil set and the reference coil set are subject to change. The physical quantity difference is generated since the inductance of the induction coil set can be lower or higher than the inductance of the reference coil set. The sensing module then receives the physical quantity difference, and outputs the sensing result. If the sensing result shows that the gun is pulled out of the holster, the control unit transmits a trigger signal and transmits the trigger signal to the communication module of the recording device by the communication unit for activating the photographing module to start recording.

Further, when the sensing result shows that the gun is pulled out of the holster, the control unit transmits the trigger signal to activate the recording device to start recording. The control unit enables the sensor device to enter a power-saving mode when determining that a period of time during which the gun is pulled out of the holster exceeds a time threshold.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
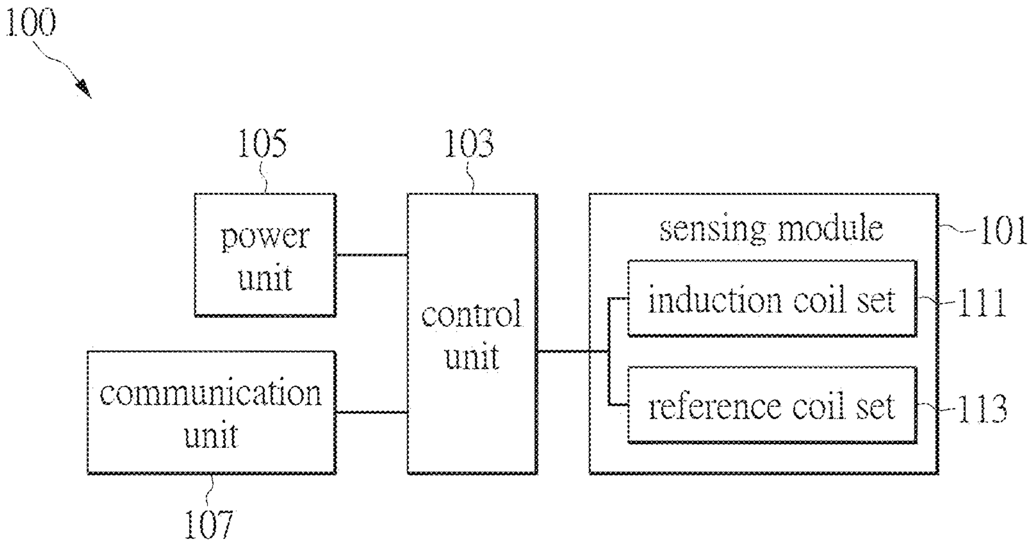
FIG. 1 is a schematic diagram illustrating circuit components of a sensor device according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure provides a sensor device that can be attached to a specific object. The sensor device is equipped with an independent power supply and an operating capability. The sensor device can also be individually disposed on the object, and the senor device applies an induction principle to detect movement of a corresponding item. The present disclosure also relates to a holster sensing system and a video-recording system that incorporate the sensor device.

FIG. 1 is a schematic diagram illustrating circuit components of the sensor device according to one embodiment of the present disclosure.

Circuit components of a sensor device 100 include a control unit 103 and other circuit components electrically connected with the control unit 103. One of the circuit components is a sensing module 101. The main structural features of the sensing module 101 are two coil sets, such as a reference coil set 113 and an induction coil set 111 arranged in a stacked structure. It should be noted that the arrangement of the two coil sets is not limited to the stacked structure, and further reference can be made to an embodiment of FIG. 3.

In one method of operating the sensor device 100, the sensor device 100 can be fixed on a surface of a side of the object via various fixing methods. While the induction coil set 111 of the sensing module 101 is configured to be in close proximity to the object, the reference coil set 113 is relatively distant from the object for providing a reference level. An item to be sensed by the sensor device 100 is preferably a metal sheet. When the position of the item changes, a physical quantity difference is formed between an inductance generated by the induction coil set 111 and the reference level provided by the reference coil set 113. Therefore, the control unit 103 can rely on this physical quantity difference to determine a position change of the item that is at the other side of the object.

According to one embodiment of the present disclosure, the circuit components of the sensor device 100 shown in FIG. 1 also include a communication unit 107. The communication unit 107 is electrically connected with the control unit 103. When the control unit 103 generates a trigger signal according to the physical quantity difference, the communication unit 107 transmits the trigger signal by a specific transmission protocol, such as BLUETOOTH™ communication protocol. For example, a BLUETOOTH™ low energy (BLE) technology is implemented for broadcasting the trigger signal. Other technologies that are able to transmit the trigger signal are, for example, a WIFI™ communication technology and a near-field communication (NFC) technology. It should be noted that implementation of the communication unit is not limited in the present disclosure.

Further, the sensor device 100 includes a power unit 105 that is electrically connected with the control unit 103 and controlled by the control unit 103. The power unit 105 supplies a current signal to the sensing module 101, and allows both the induction coil set 111 and the reference coil set 113 to respectively generate induced magnetic fields that cover the item to be sensed.

Figure 2:
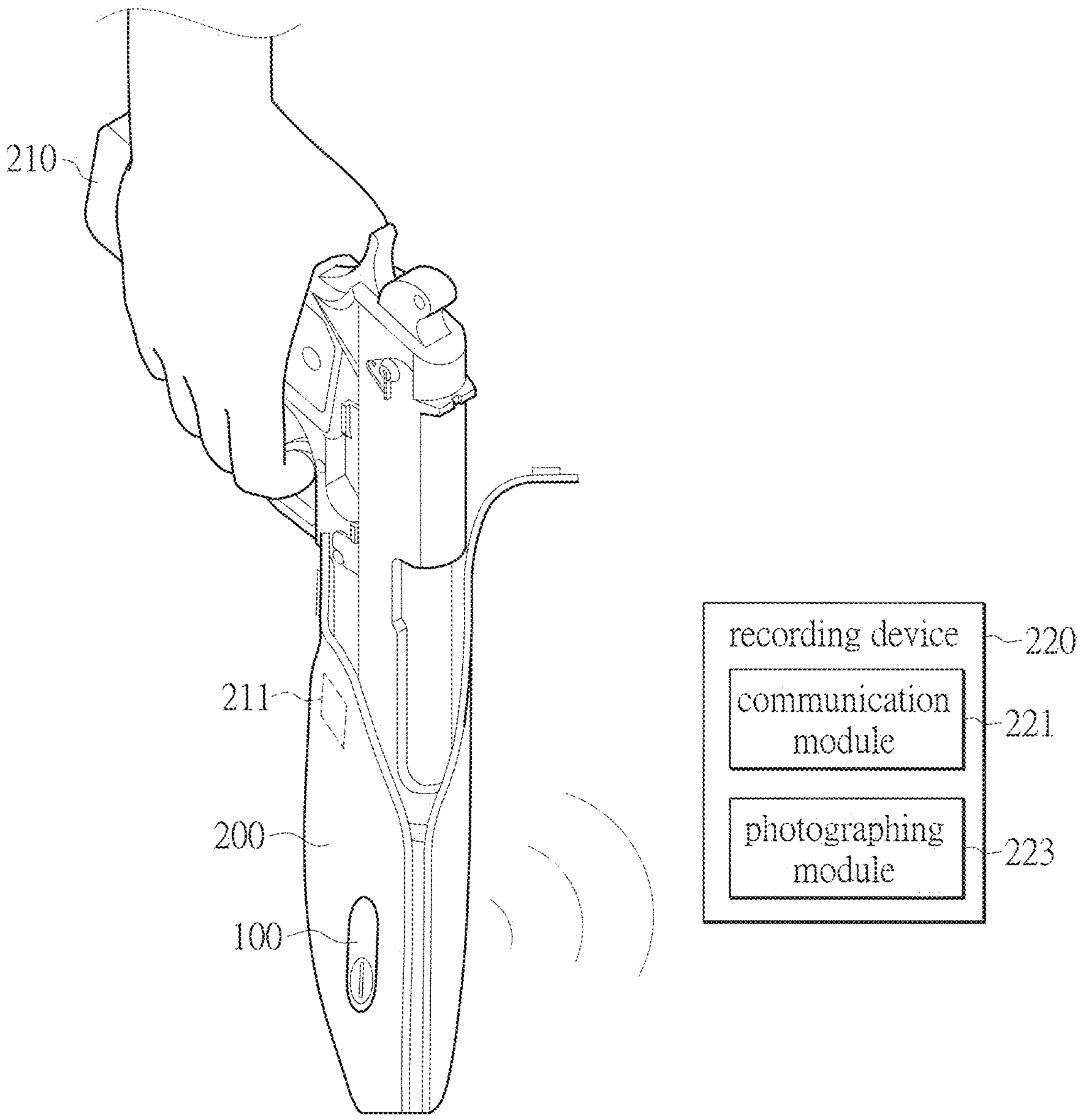
FIG. 2 is a schematic diagram illustrating a holster sensing system implemented by the sensor device according to one embodiment of the present disclosure.

Reference is made to FIG. 2, which is a schematic diagram illustrating a holster sensing system that incorporates a standalone sensor device having an independent power supply and capable of communication and signal processing according to one embodiment of the present disclosure. A video-recording system that can cooperatively operate with the sensor device is also shown in FIG. 2.

The holster sensing system shown in FIG. 2 essentially includes a holster 200 and the sensor device 100 disposed on an outer surface of the holster 200. The holster 200 is used to accommodate a gun 210. The sensor device 100 is used to sense movement of the gun 210. In one implementation, a magnetically-sensitive item (e.g., a metal item 211) that can be sensed by the sensor device 100 is configured to be disposed on the gun 210. The sensor device 100 disposed on the holster 200 corresponds in position to the metal item 211 when the gun 210 is put inside the holster 200. That is, when the gun 210 is put inside the holster 200, the metal item 211 should be disposed at a position that allows the metal item 211 to be sensed by the sensor device 100.

References are made to FIG. 1 and FIG. 2. When the holster sensing system is in operation, the power unit 105 of the sensor device 100 is used to supply the current signal to the sensing module 101 of the sensor device 100, so as to enable the induction coil set 111 and the reference coil set 113 to generate induced magnetic fields. A range of the induced magnetic fields should cover the entire metal item 211. According to one of the embodiments of the present disclosure, the induction coil set 111 of the sensor device 100 is in close proximity to the holster 200, and the reference coil set 113 is relatively distant from the holster 200.

When the gun 210 attached with the metal item 211 moves (e.g., the gun 210 is pulled out of the holster 200), the metal item 211 moves with the gun 210. At this time, the physical quantity difference is formed between the inductance generated by the induction coil set 111 and the reference level provided by the reference coil set 113. This physical quantity difference represents an inductance change between the induction coil set 111 and the reference coil set 113. The control unit 103 of the sensor device 100 can determine a position change of the metal item 211 or whether the metal item 211 is present according to an electrical signal formed from the inductance change. Therefore, the holster sensing system relies on the physical quantity difference to detect if the gun 210 is pulled out of the holster 200 or put inside the holster 200.

According to one embodiment of the present disclosure, when the inductance change between the induction coil set 111 and the reference coil set 113 of the sensor device 100 meets a threshold set by the holster sensing system, the control unit 103 of the sensor device 100 generates the trigger signal, and the trigger signal is broadcasted to devices near the sensor device 100. For example, the trigger signal can be received by a recording device 220 of FIG. 2 via a communication module 221, and a photographing module 223 can be activated by the trigger signal to start photographing. Accordingly, the recording device 220 can be immediately activated when the gun 210 is determined to be pulled out of the holster 200.

Figure 3:
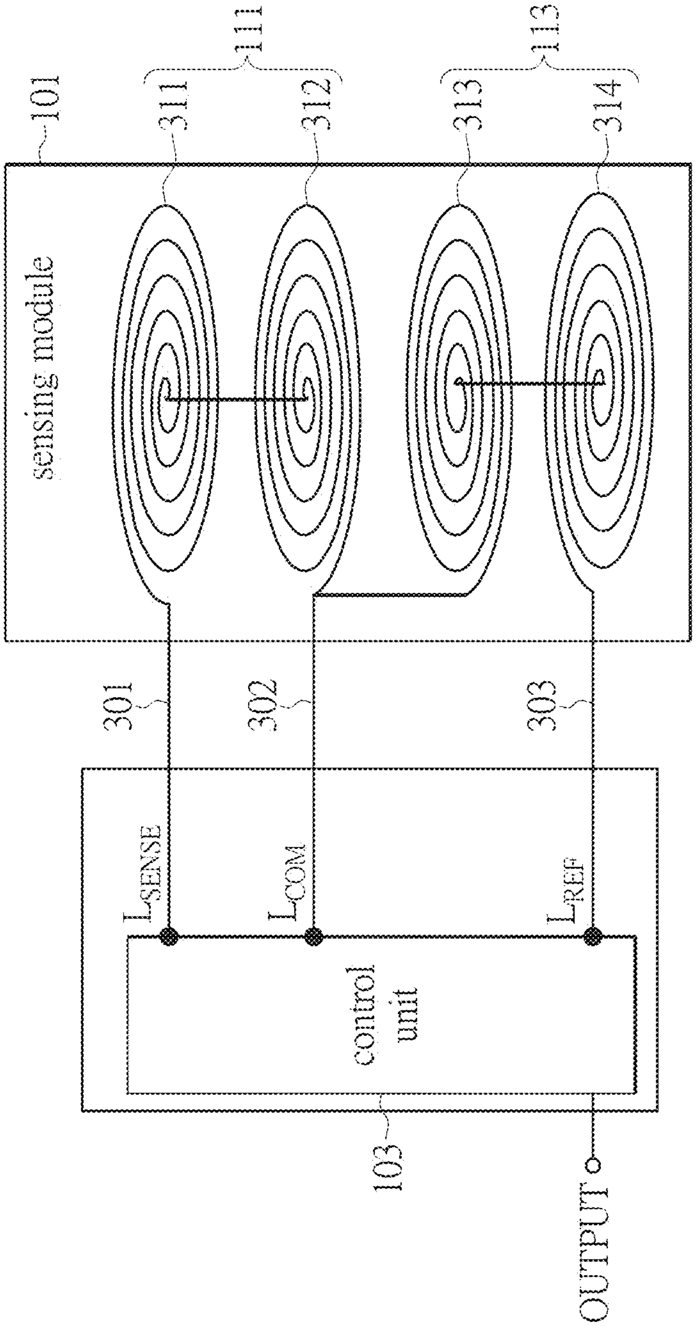
FIG. 3 is a schematic diagram illustrating induction coil sets of the sensor device according to one embodiment of the present disclosure.

FIG. 3 is a schematic diagram illustrating the main circuit components and induction coil sets of the sensor device according to one embodiment of the present disclosure.

The main components of the sensor device in FIG. 3 include the control unit 103 and the sensing module 101. The control unit 103 is capable of signal processing. The control unit 103 is electrically connected with induction coils of the sensing module 101 via connection lines 301, 302, 303. The control unit 103 can therefore receive a sensing value $L_{SENSE}$ and a reference level $L_{REF}$ generated by the sensing module 101, and provide a common ground signal $L_{COM}$.

The sensing module 101 includes the reference coil set 113 and the induction coil set 111 that are arranged to have a stacked structure. The reference coil set 113 includes a first reference coil 313 and a second reference coil 314 that are disposed on two sides of a substrate. The first reference coil 313 and the second reference coil 314 are electrically interconnected via middle contacts of the two coils. The reference coil set 113 provides the reference level $L_{REF}$. The induction coil set 111 includes a first induction coil 311 and a second induction coil 312 that are disposed on two sides of another substrate. Similarly, the first induction coil 311 and the second induction coil 312 are electrically interconnected via middle contacts of the two coils. The induction coil set 111 generates the sensing value $L_{SENSE}$. One coil of the reference coil set 113 and one coil of the induction coil set 111 can jointly form a common ground signal. As shown in the diagram, an output end of the second induction coil 312 and an output end of the first reference coil 313 jointly form the common ground signal $L_{COM}$. It should be noted here that the above embodiments are not used to limit practical implementation of the sensing module 101. For example, the reference coil set 113 of the sensing module 101 can have one layer, two layers, or multiple layers of reference coils. Similarly, the induction coil set 111 of the sensing module 101 can have one layer, two layers, or multiple layers of induction coils. The quantity of the coils of the reference coil set 113 and the induction coil set 111 is determined according to required equivalent inductance values under the same area of the substrates. For example, if the sensing module adopts a substrate having a smaller area (e.g., two centimeters in diameter), and a larger inductance value is needed, the system should use two or more layers of coils to meet the practical requirement.

In the sensor device, the sensing module 101 embodies a proximity sensor or a differential inductive switch. When a power unit (not shown in the diagram) of the sensor device is driven to supply a current to the two coil sets (311, 312, 313, 314) of the sensing module 101, the reference coil set 113 and the induction coil set 111 respectively form different effective sensing ranges, so as to form a reference inductance and an inductive inductance.

According to an operational principle of the differential inductive switch, when the current is supplied to the two coil sets of the sensor device, an electromagnetic field will be formed around each of the coil sets, and the electromagnetic field allows the two coil sets to form different effective sensing ranges. If any external metal object (e.g., the metal item attached to the gun) approaches a sensing range of an inductive proximity switch, the electromagnetic field formed around each of the coil sets of the inductive proximity switch is disrupted, thereby changing the impedance of the coil sets. Accordingly, a reference voltage is formed in the reference coil set, and an inductive voltage is also formed in the induction coil set. Therefore, the control unit can calculate a differential signal generated between the two coil sets, and the control unit can determine a position change of the metal item. Further, the control unit outputs a comparison value that can be represented by a high level or a low level, and thereby determining the position change of the metal item.

When the sensor device is in operation, the control unit can enable the sensing module by a pulse-width modulation technology. For example, the control unit can enable the proximity sensor or the differential inductive switch to detect an inductance difference between the inductance values generated by the reference coil set and the induction coil set. The sensing module then outputs a high voltage or a low voltage based on a positive or a negative inductance difference.

In one embodiment of the present disclosure, when the item to be sensed by the sensor device moves (e.g., the gun 210 is pulled out of the holster 200, or the gun 210 is put inside to the holster 200 according to the above embodiment), the metal item 211 disposed on the gun 210 moves together, such that the sensing module 101 is able to sense an inductance change between the induction coil set 111 and the reference coil set 113. That is to say, when the metal item 211 approaches or moves away from one side of the induction coil set 111, the inductance change occurs between the induction coil set 111 and the reference coil set 113. Further, since the induction coil set 111 is closer to the metal item 211, the inductance generated by the induction coil set 111 is relatively lower or higher than the inductance generated by the reference coil set 113. The sensing module 101 then receives the physical quantity difference and outputs a sensing result.

The physical quantity difference represents the inductance change between the induction coil set and the reference coil set. The control unit 103 receives the sensing value $L_{SENSE}$, the common ground signal $L_{COM}$, and an inductance change between the reference level $L_{REF}$ and the common ground signal $L_{COM}$. The control unit 103 can rely on an electrical signal converted from the inductance change to determine a position change of the metal item. The position change of the metal item can be moving away from or approaching the sensor device. That is, the position change indicates whether the metal item is leaving or entering the sensing range.

Figure 4:
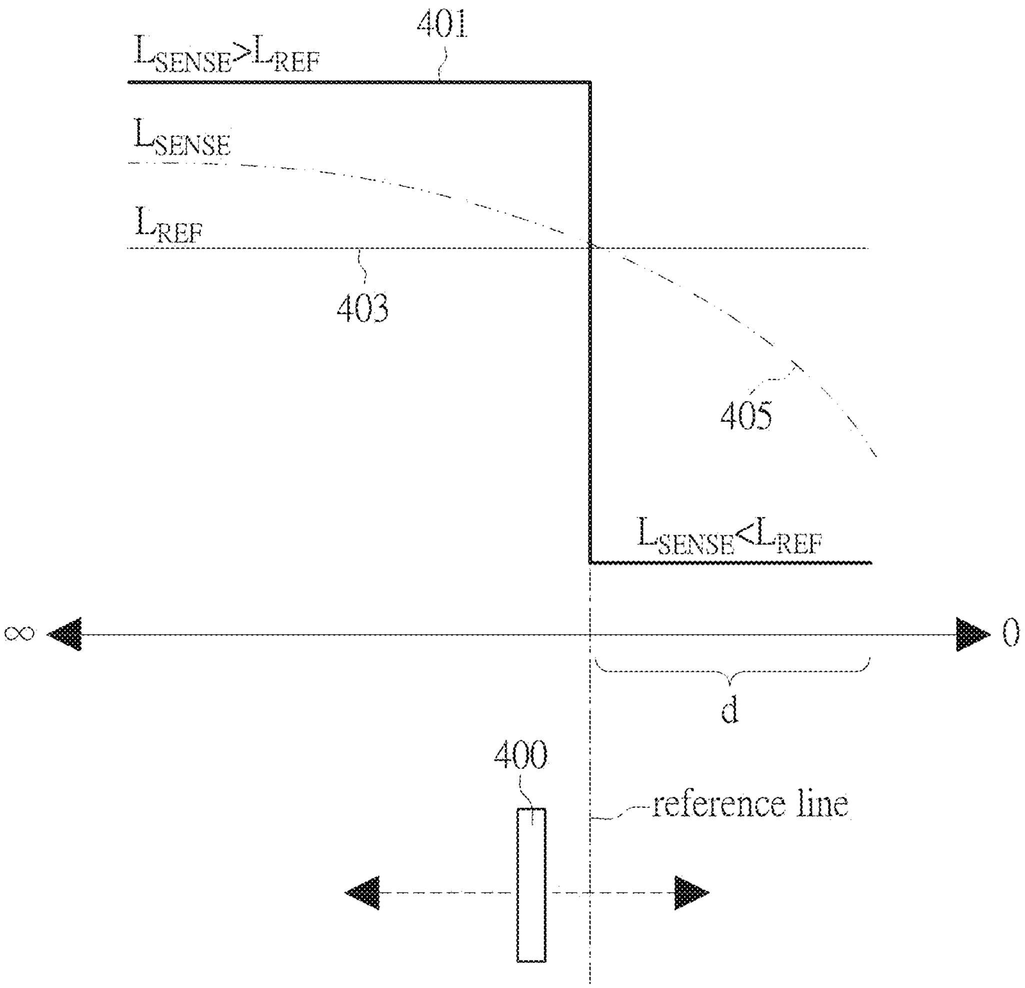
FIG. 4 is a schematic diagram illustrating a technical principle of detecting a position change of an item under test by induction coils according to one embodiment of the present disclosure.

Reference is made to FIG. 4, which is a schematic diagram illustrating a technical principle of detecting the position change of an item under test by the induction coils. It should be noted that, in FIG. 4, the control unit of the sensor device relies on a crossing point on a curve of the sensing value $L_{SENSE}$ and a curve of the reference level $L_{REF}$ to determine whether to output a high level or a low level. The control unit can therefore determine if the metal item is present and whether the metal item enters a sensing distance of the sensor device.

FIG. 4 shows inductance changes of the sensing value $L_{SENSE}$, the reference level $L_{REF}$, and the common ground signal $L_{COM}$ that occur due to movement of an item under test 400 (e.g., the metal item 211). Taking the holster sensing system as an example (referring to FIG. 2), since the item under test 400 is disposed on the gun 210, the item under test 400 is spaced apart from the sensor device 100 that is disposed on the holster 200 by an initial distance d. The reference coil set provides a constant reference level $L_{REF}$, as shown by a reference signal curve ($L_{REF}$) 403 in FIG. 4. The inductance value generated by the induction coil set changes with the movement of the item under test 400, as shown by a sensing signal curve ($L_{SENSE}$) 405 in FIG. 4. When there is a relative movement between the item under test 400 and the induction coil set of the sensor device, which includes moving away (i.e., toward "∞" direction) or approaching (i.e., toward "0" direction), the electromagnetic field provided by the induction coil set is subject to change. According to the electromagnetic induction principle, when an induction current is formed inside the coils, the coils will induce an inductance effect to generate a voltage for suppressing change of the current. Therefore, the inductance coils can resist an increasing current when the induction current increases. Conversely, the inductance coils can resist a decreasing current when the induction current decreases. The sensing signal curve ($L_{SENSE}$) 405 is formed accordingly.

The physical quantity difference represents the inductance change between the induction coil set and the reference coil set. Referring to FIG. 4, when the item under test 400 (e.g., the metal item 211) moves, an output signal curve 401 (such as a switching signal) is formed. Further, when the item under test 400 (e.g., the metal item 211) moves away from the induction coils, an equivalent inductance generated by the induction coil set will be higher than an equivalent inductance value of the reference coil set, and the sensing result is shown as a left half of the output signal curve 401 in FIG. 4. The sensing result shows that the sensing value $L_{SENSE}$ is larger than the reference level $L_{REF}$. Conversely, when the item under test 400 (e.g., the metal item 211) approaches the induction coils, the equivalent inductance of the induction coil set will be lower than the equivalent inductance value of the reference coil set, and the sensing result is shown as a right half of the output signal curve 401 in FIG. 4. The sensing result shows that the sensing value $L_{SENSE}$ is smaller than the reference level $L_{REF}$.

Therefore, the control unit 103 of the sensor device of FIG. 3 can obtain the inductance change calculated by the sensing module 101 according to the inductance values generated by the induction coil set 111 and the reference coil set 113. The control unit 103 can then rely on the inductance change to determine the position change of the metal item. An output signal OUTPUT is generated by a specific pin of the control unit 103.

In the holster sensing system, when the metal item disposed on the gun approaches or moves away from one side of the induction coil set, the control unit receives from the sensing module a sensing result that represents an inductance change between the induction coil set and the reference coil set since the inductance of the induction coil set is lower or higher than the inductance (e.g., a reference level) of the reference coil set. The control unit can rely on the output signal curve 401 shown in FIG. 4 to determine a time at which the gun is pulled out of the holster or put inside the holster, and accordingly activate a photographing module to start or stop recording.

Figure 5:
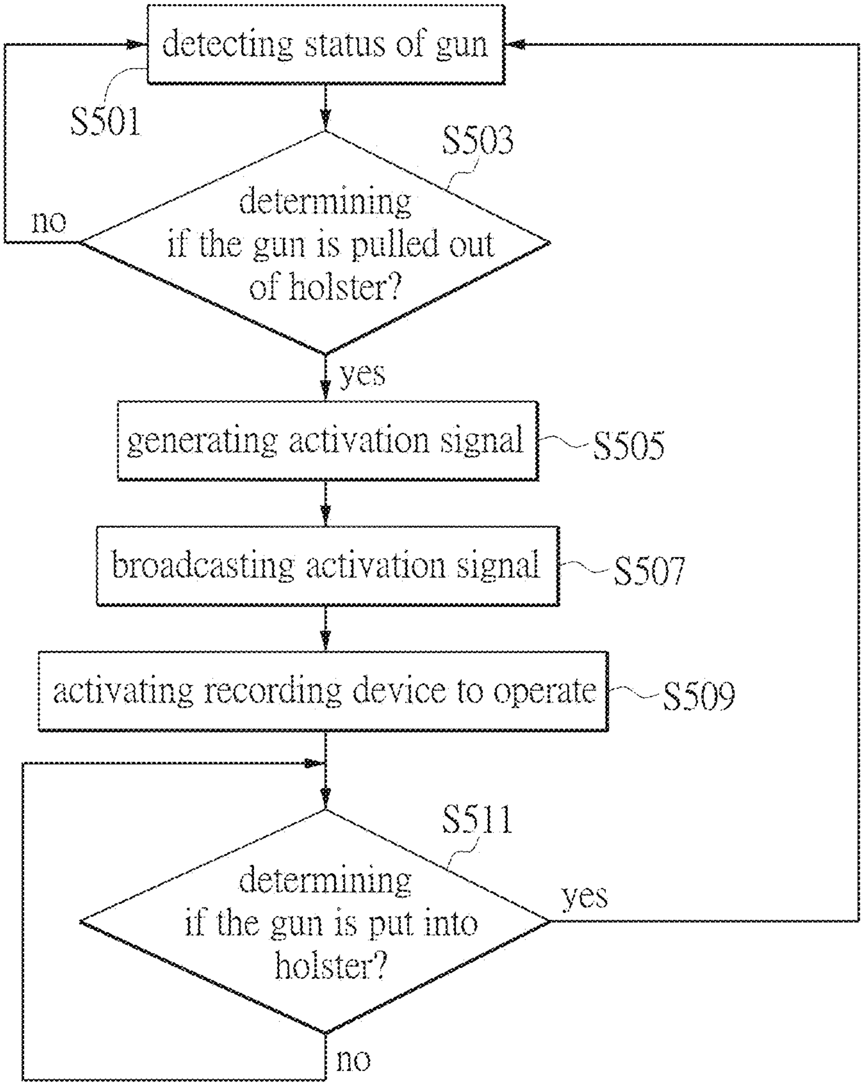
FIG. 5 is a flowchart illustrating a process of sensing a position change of a gun by the sensor device according to one embodiment of the present disclosure.

FIG. 5 is a flowchart illustrating a process of sensing the position change of the gun by the sensor device according to one embodiment of the present disclosure.

The sensor device is disposed on the holster. The metal item is attached to the gun. The sensor device corresponds in position to the metal item. After being activated, the sensor device starts to detect the status of the gun (step S501). When the control unit obtains the sensing result from the sensing module, the control unit can determine whether the gun is pulled out of the holster (step S503). If the gun is detected to be not pulled out of the holster, the process returns to step S501. If the gun is detected to be pulled out of the holster, the control unit generates the trigger signal (step S505), and broadcasts the trigger signal via the communication unit (step S507). The trigger signal can record the event of the gun being pulled out of the holster and a timestamp of the event. Upon receiving the trigger signal, a recording device is activated to start recording (step S509).

When the recording device is recording, the sensor device continues to operate. The control unit determines the position change of the gun (the metal item) according to an electrical signal generated by the sensing module. The process proceeds with detecting whether the gun is put inside the holster (step S511). If the gun is detected to be not put inside the holster, the step S511 is repeated. If the gun is detected to be put inside the holster, the process returns to the initial step S501. In one embodiment of the present disclosure, when the gun is detected to be put inside the holster according to the sensing result, the control unit can transmit a termination signal and broadcast the termination signal. Upon receiving the termination signal, the recording device stops recording.

It should be noted that the sensor device provides a power-saving mode. For example, in step S503, when the control unit determines that the gun is pulled out of the holster according to the sensing result, the control unit of the sensor device generates the trigger signal. In the meantime, the control device starts a timer for determining whether a duration for pulling the gun out of the holster exceeds a time threshold. If the duration for pulling the gun out of the holster exceeds the time threshold, the sensor device enters the power-saving mode. When the sensor device enters the power-saving mode, the sensor device stops transmitting a trigger signal for power-saving control until the sensing module senses the gun again (i.e., the gun is accommodated into the holster). At this time, the system returns to the process for detecting the status of the gun and determining whether to transmit the trigger signal.

Figure 6:
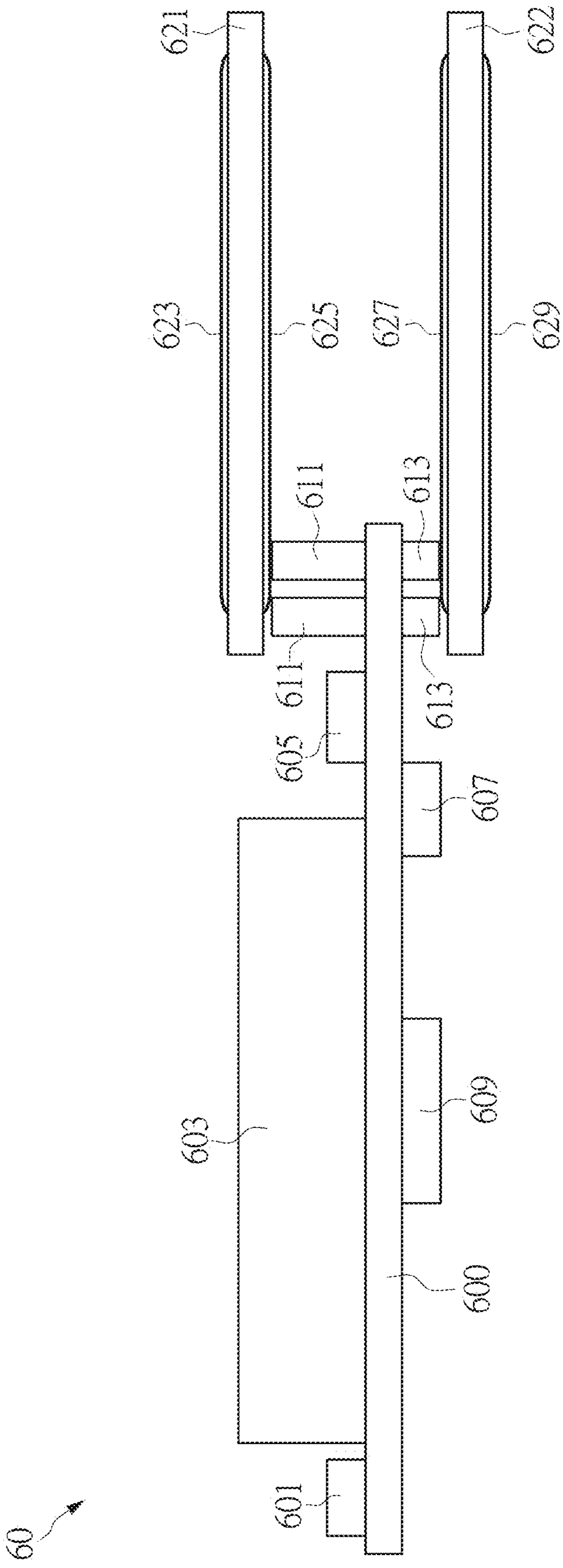
FIG. 6 is a schematic diagram illustrating circuits of the sensor device according to one embodiment of the present disclosure.

Reference is made to FIG. 6, which is an exemplary example of the circuit components of the sensor device.

FIG. 6 shows a sensor device 60 that includes a main board 600. The main board 600 serves as a control circuit board of the sensor device 60. Various circuit components are disposed on the main board 600. FIG. 6 shows that the sensor device 60 includes an indication light (e.g., light emitting diode (LED)) 601 for indicating an operating status of the sensor device 60 and a power unit (e.g., a battery) 603 for supplying power to the sensor device 60. The main board 600 of the sensor device 60 also includes a power button 605, a control unit 607, and a communication unit 609.

A user can push the power button 605 to activate or deactivate the sensor device 60. The communication unit 609 is used to transmit signals generated by the control unit 607. The control unit 607 can be a microcontroller used in the sensor device 60 for controlling operation of the sensor device 60 and for determining the position of the item under test according to the sensing result generated by the sensing module.

According to one of the embodiments of the present disclosure, the sensor device provides a power-saving mechanism. The control unit 607 can perform a timer pulse-width modulation (PWM) control for controlling timing by a pulse width modulation technology. In this way, the sensor device can achieve frequency controlling. Not only is the sensing module of the sensor device 60 enabled to obtain the inductance values generated by the induction coil set and the reference coil set, but the control unit 607 is also allowed to enter the power-saving mode (e.g., MCU (microcontroller unit) sleep mode) under a specific circumstance (e.g., the gun being pulled out of the holster for a long time). For example, when the control unit 607 enters the power-saving mode, the communication function of the control unit 607 is deactivated, or a working frequency of the control unit 607 is reduced.

The main board 600 electrically connects with a first substrate 621 of the reference coil set and a second substrate 622 of the indication coil set via conductive connectors 611 and 613, respectively. The reference coil set includes references coils 623 and 625 disposed on two sides of the first substrate 621, and the induction coil set includes induction coils 627 and 629 disposed on two sides of the second substrate 622.

In the sensing module, the coils disposed on the two sides are configured in a stacked structure, so as to form an induced magnetic field. The induced magnetic field can cover the item under test, e.g., the metal item. When the item under test moves, an equivalent inductance generated by the induction coils changes accordingly. Further, for the stacked induction coil set and reference coil set, the equivalent inductance of the two coil sets changes when the item under test approaches the coil sets. Due to the structural design, the change of the equivalent inductance of the induction coil set will be larger than the change of the equivalent inductance of the reference coil set.

It should be noted that an inductive range of the induction coil is approximately proportional to a distance between the induction coil and the item under test since an inductive distance becomes shorter when the item under test (e.g., the metal item) approaches the sensing module. Therefore, the size of the reference coil set is designed to be as small as possible, so as to improve the problem of the distance for sensing the item under test being shortened due to changes of the equivalent inductance of the reference coil set when the item under test approaches the induction coil.

In one of the embodiments of the present disclosure, the induction coil set is configured to be closer to the holster, and the reference coil set is configured to be relatively distant from the holster. Accordingly, if an inductive area of the reference coil set (the reference coils 623, 625) is configured to be smaller than an inductive area of the induction coil set (the induction coils 627, 629), the influence of the reference coil set (the reference coils 623, 625) on the induction coil set (the induction coils 627, 629) and the sensing result can be reduced, thereby effectively reducing an inductance change caused by the metal item approaching the reference coil set.

Regarding the exemplary structure of the sensor device, reference can be made to the schematic diagrams of FIG. 7 to FIG. 10. In one of the embodiments of the present disclosure, the greater the distance between the reference coil set and the induction coil set of the sensor device, the greater the distance between the detectable item under test and the sensor device. On the other hand, the shorter the distance between the sensor device and the item under test, the more sensitive the detection of the item under test. Therefore, a casing of the sensor device can include the reference coil set and the induction coil set, and one of the reference coil set or the induction coil set can be moved to the outside of the casing, so as to increase the distance between the reference coil set and the induction coil set. Furthermore, the external induction coil set can be attached to a surface of an object close to the item under test for shortening the distance from the item under test.

Figure 7:
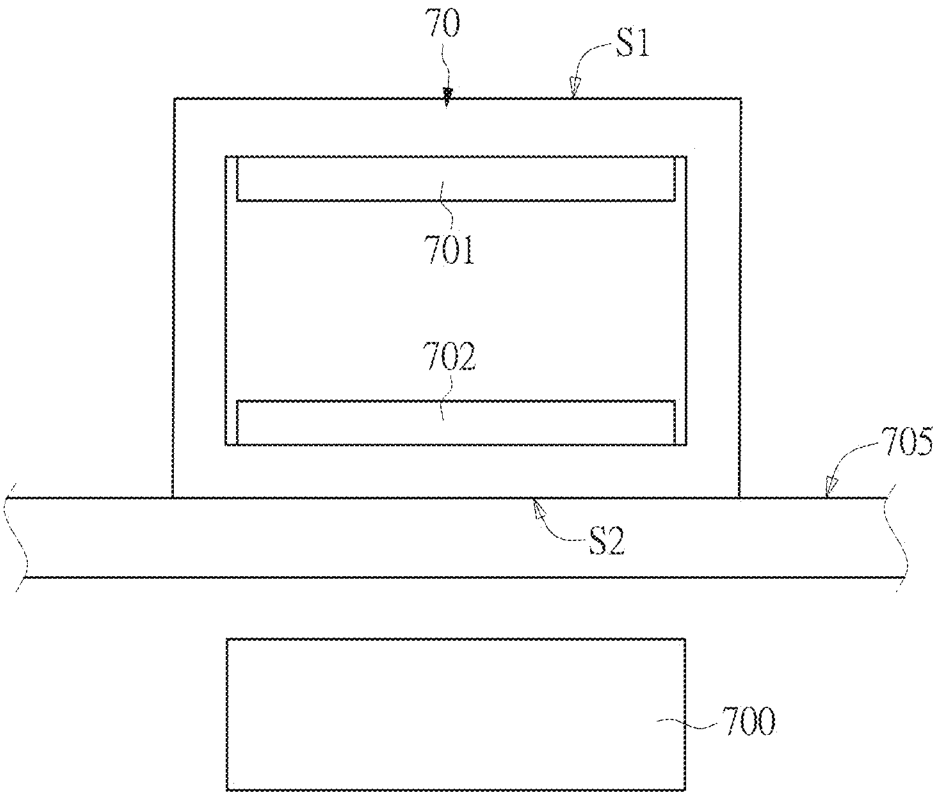
FIG. 7 is a schematic diagram illustrating a structure of the sensor device according to one embodiment of the present disclosure.

Reference is made to FIG. 7, which is a schematic diagram illustrating the structure of the sensor device according to one embodiment of the present disclosure. The sensor device includes a casing 70 that is adapted to be disposed on a surface of a side of an object. The casing 70 of the sensor device of FIG. 7 is attached to an adhesive surface 705. The casing 70 has a first side S1 that is distant from the adhesive surface 705 and a second side S2 that is relatively closer to the adhesive surface 705.

In the present embodiment, a first induction coil set and a second induction coil set are both disposed on an inner surface of the casing 70. In one of the embodiments, the first induction coil set (e.g., the reference coil set 701) is disposed on the first side S1, and the second induction coil set (e.g., the induction coil set 702) is disposed on the second side S2. Referring to the embodiment shown in FIG. 6, a control circuit board of the sensor device is electrically connected with connection lines of the first induction coil set and the second induction coil set and the microcontroller (e.g., the control unit).

When the system is in operation, the sensor device disposed on one side of the adhesive surface 705 is used to detect the item under test 700 that is disposed on another side of the adhesive surface 705. The item under test 700 is required to be an object that is detectable by the inductance coil for formation of an inductance change. The microcontroller of the sensor device relies on a physical quantity difference between the first induction coil set and the second induction coil set to determine a position change of the item under test 700.

Taking a holster sensing system as an example, the adhesive surface 705 can be an outer surface of a holster, and a gun is disposed at another side of the holster. The gun serves as the item under test 700 of FIG. 7. The sensor device is used to detect the status of the gun, i.e., whether the holster is pulled out of the holster or the gun is accommodated in the holster. In one further embodiment of the present disclosure, a detectable metal item (e.g., the item under test 700 of FIG. 7) is attached to the gun. The sensor device disposed on the outer surface of the holster is used to detect the position change of the metal item, so that the sensor device can detect whether the gun is pulled out of the holster or accommodated into the holster.

Figure 8:
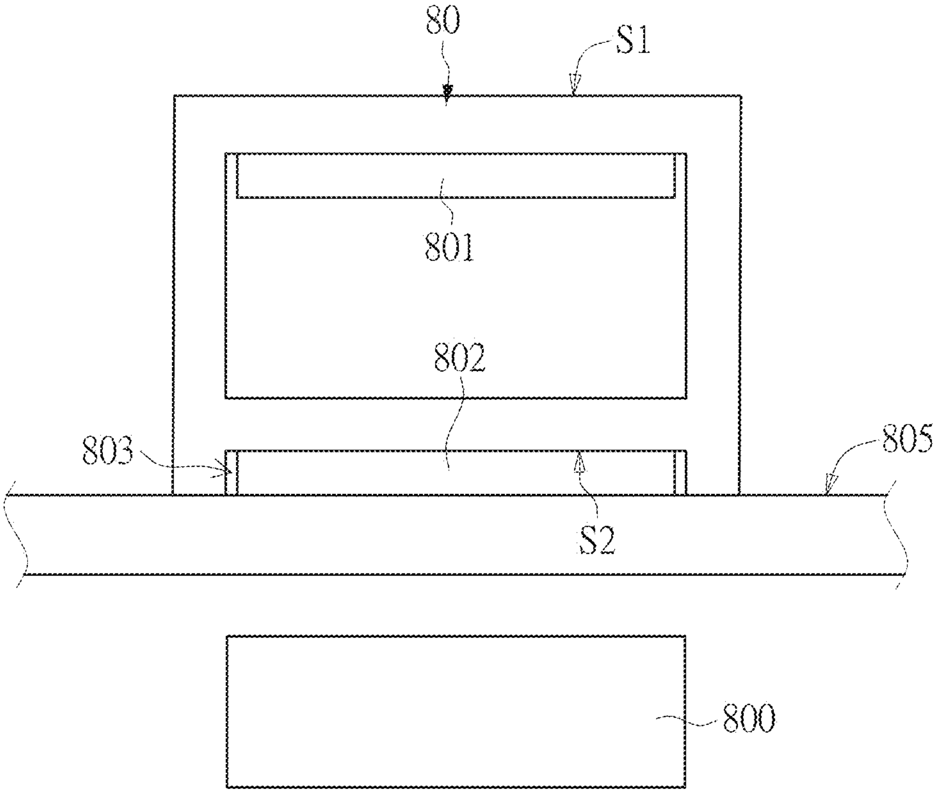
FIG. 8 is a schematic diagram illustrating the structure of the sensor device according to another embodiment of the present disclosure.

FIG. 8 is a schematic diagram illustrating the structure of the sensor device according to another embodiment of the present disclosure. In order to improve a sensing distance and sensitivity, within a limited space of the casing, a distance between the two induction coil sets inside the casing is required to be increased, and a distance between the sensor device and the item under test is required to be shortened. In the present embodiment, a distance between a first induction coil set and a second induction coil set can be increased, so as to increase the sensing distance for sensing the item under test. Further, by shortening a distance between the induction coil set and the item under test, the sensitivity of sensing the item under test can be improved.

FIG. 8 shows a casing 80 of the sensor device according to one embodiment of the present disclosure. Similarly, the first induction coil set (e.g., a reference coil set 801) can be disposed on a first side S1 of the casing 80. Further, the second induction coil set (e.g., an induction coil set 802) can be disposed on a second side S2 of the casing 80. In the present embodiment, the second side S2 serves as an outer surface of the casing 80. The second induction coil set (e.g., the induction coil set 802) is disposed in a containing slot 803 formed on the outer surface. Structurally, the second induction coil set is attached to an adhesive surface 805. Therefore, the second induction coil set is closer to an item under test 800 that is at the other side of the adhesive surface 805, and the distance between the second induction coil set and the first induction coil set (e.g., the reference coil set 801) can be increased.

It should be noted that, as compared with the embodiment of FIG. 7, the induction coil set 802 is closer to the item under test 800 by being disposed on the outer surface of the casing 80 in the embodiment of FIG. 8. When the induction coil set 802 is closer to the item under test 800, the sensor device can more sensitively detect the item under test 800 since a detectable distance is increased.

Figure 9B:
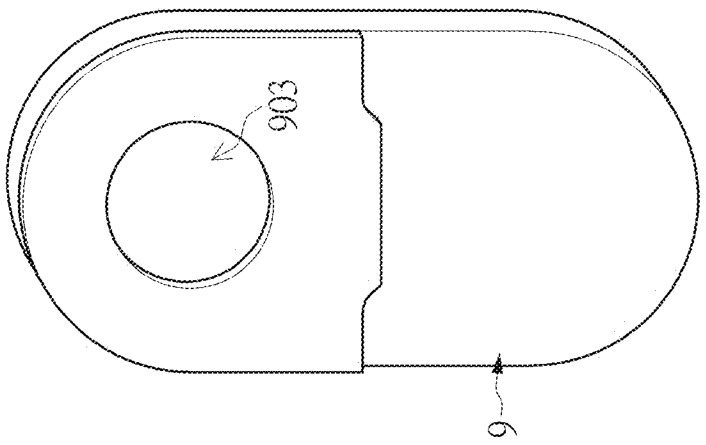
FIG. 9A and FIG. 9B are schematic diagrams illustrating the structure of the sensor device according to yet another embodiment of the present disclosure.
Figure 9A:
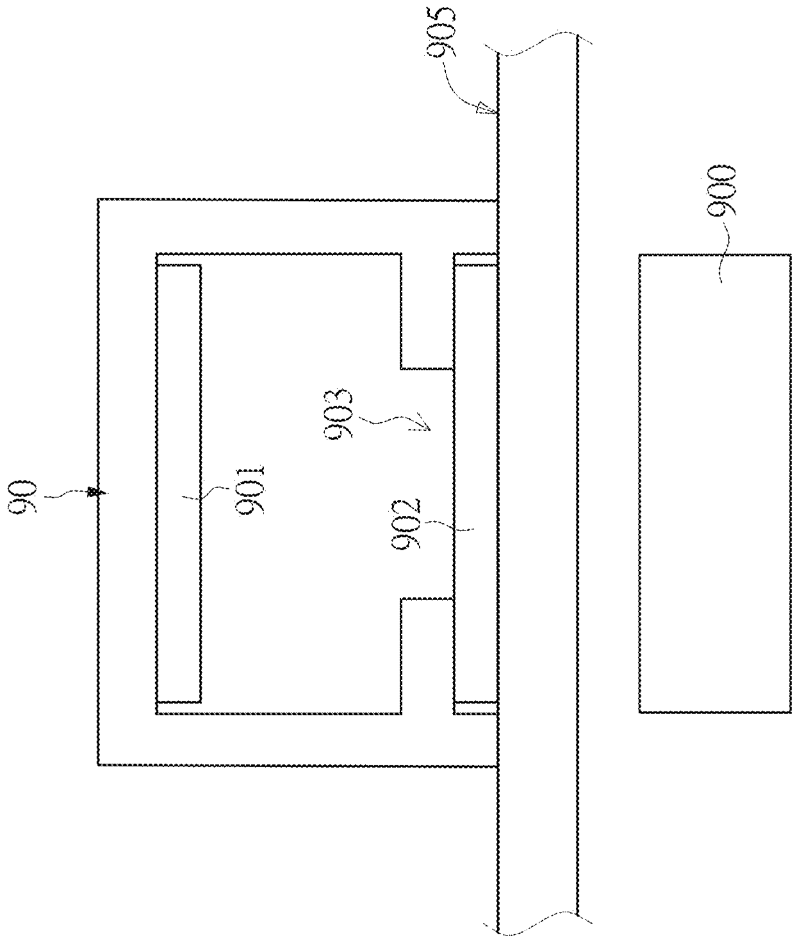

Reference is made to FIG. 9A, which is a schematic diagram illustrating the structure of the sensor device according to yet another embodiment of the present disclosure. An opening 903 is formed on a wall structure of a casing 90 that has a second induction coil set (e.g., an induction coil set 902) disposed thereon, such that the second induction coil set (e.g., the induction coil set 902) and a first induction coil set (e.g., a reference coil set 901) are not obstructed by the wall structure. Similarly, the second induction coil set of the sensor device is configured to be closer to a surface of an adhesive surface 905 for sensing a position change of an item under test 900.

Reference is made to FIG. 9B, which is a schematic diagram of a sensor device 9 that is not structurally attached to a holster, and does not have the second induction coil set (e.g., the induction coil set 902) disposed on a back side thereof. The opening 903 is formed on the back side of the casing 90. The second induction coil set (e.g., the induction coil set 902) is configured to be disposed in a containing slot of the casing 90, so as to cover and seal the opening 903 of the casing 90. Therefore, the second induction coil set can be regarded as a part (i.e., an exterior part) of the casing 90.

Figure 10:
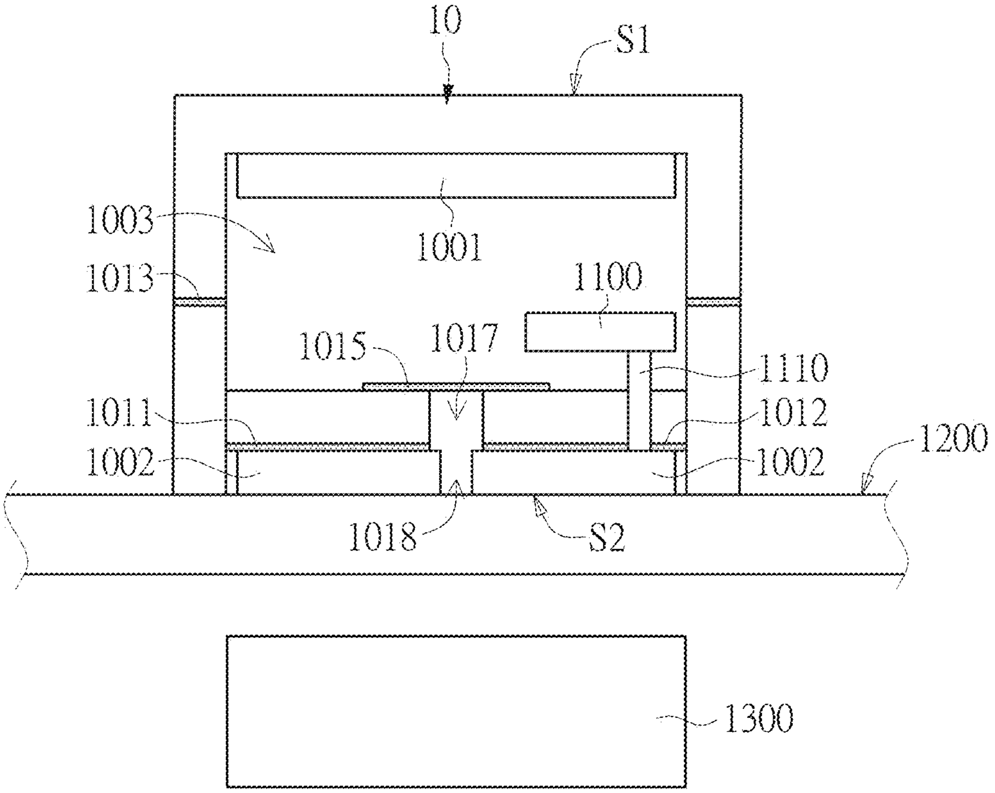
FIG. 10 is a schematic diagram illustrating the structure of the sensor device according to still another embodiment of the present disclosure.

FIG. 10 is a schematic diagram illustrating the structure of the sensor device according to still another embodiment of the present disclosure.

In FIG. 10, a first induction coil set (e.g., a reference coil set 1001) is mounted on a first side S1 of a casing 10 of the sensor device. A second induction coil set (e.g., an induction coil set 1002) of the sensor device is mounted on a second side S2 of the casing 10. In the present embodiment, the second side S2 is an outer surface of the casing 10. In particular, the second side S2 of the casing 10 is configured to have a positioning hole 1017 that serves as an airtight evacuation hole for a cavity 1003 of the casing 10. In the present embodiment, the airtight evacuation hole is sealed by a waterproof breathable membrane 1015, and an opening 1018 opposite to the positioning hole 1017 is provided for the induction coil set 1002.

In order to provide the waterproof function, waterproof glues 1011, 1012, 1013 are disposed at many places inside the casing 10 of the sensor device. In one embodiment, a main board 1100 of the sensor device can be disposed in the cavity 1003 of the casing 10. The main board 1100 is electrically connected with the reference coil set 1001 and the induction coil set 1002 via a conductive connection structure 1110. The induction coil set 1002 is structurally adjacent to an adhesive surface 1200, such that the sensor device is able to detect a position change of an item under test 1300 more effectively.

In conclusion, in the sensor device, the holster sensing system, and the video-recording system provided by the present disclosure, the sensor device includes a control unit and a sensing module. The sensing module includes a reference coil set and an induction coil set that are arranged in a stacked structure. The sensor device is attached to the holster for determining the status of the gun. The sensor device can further be applied to a body-worn video-recording system. Therefore, when an emergency occurs, and a user pulls out the gun from the holster, an inductance change of the sensor device can be used to determine that the gun is pulled out of the holster, and the control unit of the sensor device transmits a trigger signal to activate the recording device to start recording.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A holster sensing system, comprising:

a holster for accommodating a gun, wherein the gun comprises a sensing metal; and a sensor device disposed on the holster, wherein the sensor device corresponds in position to the sensing metal when the gun is accommodated into the holster;

wherein the sensor device comprises:

a control unit;

a sensing module electrically connected with the control unit, the sensing module comprising a reference coil set and an induction coil set; and a power unit electrically connected with the control unit, wherein the power unit is controlled by the control unit to supply current signals to the sensing module, such that the induction coil set and the reference coil set are enabled to induce a magnetic field;

wherein an inductive area of the reference coil set is smaller than an inductive area of the induction coil set, the induction coil set of the sensing module is adjacent to the holster, and the reference coil set is distant from the holster; wherein the control unit determines whether the sensing metal disposed on the gun is present in the holster based on a physical quantity difference between a sensing value generated by the induction coil set and a reference level provided by the reference coil set.

2. The holster sensing system according to claim 1, wherein the reference coil set comprises two first coils disposed on two sides of a first substrate, the induction coil set comprises two second coils disposed on two sides of a second substrate, and the reference coil set and the induction coil set are arranged in a stacked structure.

3. The holster sensing system according to claim 2, wherein the physical quantity difference is an inductance change between the induction coil set and the reference coil set, and the control unit determines whether the sensing metal is present according to an electrical signal formed by the inductance change.

4. The holster sensing system according to claim 1, wherein the sensing module of the sensor device implements a proximity sensor or a differential inductive switch; wherein the power unit supplies the current signals to the reference coil set and the induction coil set of the sensing module, and the reference coil set and the induction coil set form two different effective sensing ranges for respectively generating a reference inductance and an inductive inductance.

5. The holster sensing system according to claim 1, wherein the sensing metal approaches or moves away from a side of the induction coil set, inductances formed by the induction coil set and the reference coil set are subject to change, and the inductance of the induction coil set is lower or higher than the inductance of the reference coil set, so as to generate the physical quantity difference received by the sensing module and output a sensing result.

6. The holster sensing system according to claim 5, wherein the control unit generates a trigger signal in response to determining that the gun is pulled out of the holster based on the sensing result, and enables the sensor device to enter a power-saving mode in response to determining that a period of time during which the gun is pulled out of the holster exceeds a time threshold.

7. A video-recording system, comprising:

a recording device comprising a communication module and a photographing module;

a holster for accommodating a gun, wherein the gun comprises a sensing metal; and a sensor device disposed on the holster, wherein the sensor device corresponds in position to the sensing metal when the gun is accommodated into the holster;

wherein the sensor device comprises:

a control unit;

a sensing module electrically connected with the control unit, the sensing module comprising a reference coil set and an induction coil set; and a power unit electrically connected with the control unit, wherein the power unit is controlled by the control unit to supply current signals to the sensing module, such that the induction coil set and the reference coil set are enabled to induce a magnetic field;

wherein an inductive area of the reference coil set is smaller than an inductive area of the induction coil set, the induction coil set of the sensing module is adjacent to the holster, and the reference coil set is distant from the holster; wherein the control unit determines whether the sensing metal disposed on the gun is present in the holster based on a physical quantity difference between a sensing value generated by the induction coil set and a reference level provided by the reference coil set;

wherein the sensing metal approaches or moves away from a side of the induction coil set, an inductance generated by the induction coil set is lower or higher than an inductance generated by the reference coil set, and the sensing module receives the physical quantity difference and outputs a sensing result; wherein when the sensing result shows that the gun is pulled out of the holster, the control unit transmits a trigger signal to the communication module of the recording device, so as to activate the photographing module to start recording.

8. The video-recording system according to claim 7, wherein the physical quantity difference is an inductance change between the induction coil set and the reference coil set, and the control unit determines whether the sensing metal is present according to an electrical signal formed by the inductance change.

9. The video-recording system according to claim 7, wherein the sensing module of the sensor device implements a proximity sensor or a differential inductive switch; wherein the power unit supplies the current signals to the reference coil set and the induction coil set of the sensing module, and the reference coil set and the induction coil set form two different effective sensing ranges for respectively generating a reference inductance and an inductive inductance.

10. The video-recording system according to claim 7, wherein the reference coil set comprises two first coils disposed on two sides of a first substrate, the induction coil set comprises two second coils disposed on two sides of a second substrate, and the reference coil set and the induction coil set are arranged in a stacked structure.

11. The video-recording system according to claim 7, wherein the sensing module outputs the sensing result upon receiving the physical quantity difference; wherein when the sensing result shows that the gun is pulled out of the holster, the control unit transmits the trigger signal to activate the recording device to start recording; wherein the control unit enables the sensor device to enter a power-saving mode when the control unit determines that a period of time during which the gun is pulled out of the holster exceeds a time threshold.

* * * * *